United States Patent [19]

Vor

[11] Patent Number: 5,368,752
[45] Date of Patent: Nov. 29, 1994

[54] METHOD OF WASHING FILTERS, AND FILTERS FOR LIQUID FILTRATION

[76] Inventor: Zdenek Vor, Sollidenvägen 3, 183 65 Täby, Sweden

[21] Appl. No.: 30,438
[22] PCT Filed: Oct. 16, 1990
[86] PCT No.: PCT/SE90/00660
 § 371 Date: Mar. 30, 1993
 § 102(e) Date: Mar. 30, 1993
[87] PCT Pub. No.: WO92/06759
 PCT Pub. Date: Apr. 30, 1992
[51] Int. Cl.$^5$ .............................. B01D 24/14
[52] U.S. Cl. ................... 210/792; 210/269; 210/409
[58] Field of Search ............ 210/786, 792, 795, 269, 210/275, 279, 412, 793, 409

[56] References Cited

U.S. PATENT DOCUMENTS 1,767,729 4/1929 Baynard et al.
3,731,803 5/1973 Hirs ................................ 210/279
4,627,923 12/1986 Ross ............................... 210/786

FOREIGN PATENT DOCUMENTS 1118754 12/1961 Germany.

Primary Examiner—Frank Spear
Assistant Examiner—W. L. Walker
Attorney, Agent, or Firm—Larson and Taylor

[57] ABSTRACT

The invention relates to a method for washing a filter intended for cleansing a contaminated liquid and having a granular bed, a drainage system located beneath the bed, means for introducing first and second liquid flows into the bed, wherein the first liquid flow is operative to fluidize solely upper bed layers at least locally, and the second liquid flow is operative to fluidize the bed throughout the whole of its depth. The method teaches ejecting the flows of liquid selectively into the bed through orifices which are placed in the bed at a location between the highest point and the lowest point therein and which are substantially equidistant from the upper surface of the bed; and by introducing the first liquid stream into the upper layers of said bed in a smaller quantity and at a corresponding smaller rate than the second liquid stream, such that the bed layers located beneath these upper layers will be unaffected by the ongoing bed washing operation.

4 Claims, No Drawings

METHOD OF WASHING FILTERS, AND FILTERS FOR LIQUID FILTRATION

The present invention relates to a method of washing filters and also to liquid filters which comprise a granular filter bed.

In filtering liquids which contain dispersed particles, emulsified and dissolved substances, the bed becomes blocked and clogged after a while and must be cleansed of the material caught in the bed, i.e. the bed must be washed. This is effected by introducing a stream of liquid into the bed, from beneath. The bed granules are fluidized in the liquid flow, porosity of the bed increases and the material captured in the bed are carried away with the liquid flow. Another method comprises the steps of removing granular material from the bed, cleansing the granules externally of the bed and then replacing the granules.

The particles suspended in a liquid to be filtered may extend from 1 nm up to several nm, and the filtering mechanism is adapted in accordance therewith. Particles which are larger than 0.1 times the grain diameter of the bed are separated or extracted by mechanical screening in the outer layers of the filter. Smaller particles are attracted to the upper surface of the bed grains or granules with which they collide, and are held thereto These particles penetrate deeply into the bed, whereas the coarser particles rapidly seal the outer bed layers and necessitate washing of the filter bed, although the bed has not been clogged throughout the whole of its depth. In order to extract small particles from the contaminated liquid to be filtered, it is necessary to destabilize the dispersion; precipitation in contact with bed granules is referred to as contact filtration and the particle extraction effect increases with filtering time. Bed washing at short intervals is undesirable. Because it is impossible to avoid mechanical screening on the filter surfaces and clogging or blocking of the filter, the majority of filters are directed to surface filtration and small particles are flocculated prior to being introduced to the bed, therewith enabling the particles to be sieved mechanically.

Known filter constructions which endeavour to improve bed utility are multimedia filters, continuously washed filters with movable beds which are washed outside the filters, and upstream filters. In the case of multimedia filters, the problem is distributed to surface screening in each medium, although the problem is nevertheless not solved satisfactorily. A better solution for effective downstream filtration is not known in practical use, however. Other solutions that have been proposed have not been brought into practical use, often because of small details and the unknown filtering mechanisms. Movable bed filters have a poor effect in contact filtration processes; the material caught in the bed is torn from the bed granules, which are in constant movement. The use of upstream filters in contact filtration processes is often encumbered with problems impossible to solve.

The increase resistance in the bed is a decisive factor when cleaning filters, and contact filters in particular. This resistance also describes the complete filtering mechanism. I have found the following relationship by taking measurements:

$$H = k_1 \cdot T \cdot SS \cdot V_F^2 + k_2 \cdot l_2 + k_3 \cdot l_3 + k_4 \cdot l_4$$

where the first factor describes blockaging of the outer surfaces of the filter.

The inventive filter and the inventive filter-washing method and regeneration of the bed are adapted to this equation. The rapidly blocked surface layers are washed, or flushed, separately at least once between two sequential washing operations. When washing the outer layers, the deeper bed layers are not touched and the bed in these locations therewith retains precipitated and collected material, sludge. Washing or flushing of the bed is carried out in a manner to prevent layering of the bed material. This reduces other factors in the equation. The inventive filter is also provided with bottom drainage means through which filtrate is discharged from the bed, means for introducing bed-flushing air and filtrate for bottom flushing, and also with pumps, pipes and control means, etc. for carrying out the inventive method in accordance with the following example.

In a downstream pressure filter, green water outflow openings are provided in the bed at a depth of about 0.4 mm beneath the sand surface, and during filtration water flows down through the bed and is removed as filtrate through drainage means in the filter bottom. The water level is maintained at a substantially constant distance above the sand surface, with the aid of compressed air in the upper part of a filter container. By changing the ratio between the amount of water introduced and the amount of water removed at short intervals, a brief, upwardly directed stream is obtained from inlet openings directed towards the upper surface of the sand bed and the surroundings of the outlet openings, and the bed above is fluidized and the sludge flushed up. The sludge remains in the bed downwardly of the openings, even if filtration is continued while flushing or washing upper bed layers. The upper bed layers can be washed, for instance, by reducing the air pressure in the filter container, or by throttling the drainage flow, or in some other way. Subsequent to having washed the upper bed layers several times, the whole of the bed is then washed, or flushed, so as also to carry away the sludge from other washing or flushing operations, the sludge having collected in the water volume on the upper surface of the sand.

An example of the construction of the filter:

Arranged in the upper part of the bed in an open or a closed (pressure) filter comprising a granular bed drainage system in the bottom (downstream filter) is a green water distribution system and pipes having openings which direct the outflowing water stream down towards the bottom, on which the drainage system is mounted. The openings are configured as pipe orifices having diameters of 40 mm. When washing the filter throughout the whole of its depth, about 20 l/s water is required through each opening in order to fluidize the bed volume. The cross-sectional area of the openings is calculated to obtain a water jet which will penetrate through the whole of the bed volume. When washing upper layers located around and above said openings, a water flow rate of about 4 l/s is required through each of said openings. The openings are located at mutually the same distance from the upper surface of the bed, i.e. a distance of about 0.4 m. The smaller water flow rate means that depths greater than 0.5 m from the upper surface of the bed will not be affected by the water Jets. The known washing action of downstream filters with the aid of drainage systems cannot contribute in washing solely upper bed layers.

In accordance with another embodiment of the inventive filter and method, the water jet directing device has the form of a disk having a hole diameter of 40 mm and affixed concentrically downwardly of the outflow opening. When washing solely the upper bed layers, the disk assists in ensuring that about 80% of the outflowing water is turned towards the sides and upwards. When washing deep layers, the water flow passes straight downwards through the hole.

The aforedescribed embodiments include bed-washing or flushing devices, pipes, valves, pumps, etc., all of which are securely mounted in and adjacent filter boxes.

In accordance with a further embodiment suitable for large filter plants, the washing equipment or parts thereof is supported by a carriage which moves above rows of filters. Pipes which present outflow openings can be lowered into the bed, to desired levels, which may be located at greater distances from the upper surface of the bed when washing the bed throughout the whole of its depth than when washing solely the upper bed layers. The volumetric rate of flow of the concentrated water jet is adapted to the desired washing depth at which the bed is fluidized. The carriage may either be stationary during the washing process, or may be moved so as to also move the fluidized zone. The slime washed from the bed is removed from above the fluidized sand. Filtrate from bed parts not affected by the washing process may be removed through the drainage system of the downstream filter during an ongoing washing process, while appropriate parts of the drainage system can take part in the washing process. Similar to the other filter embodiments described above, the present embodiment may also be provided with water-flow directing devices and changes may also be made between the ratios of incoming and outgoing quantities of washing water, and therewith to the pressure relationships in the washed zone. As an alternative to the aforesaid carriage, a permanent pipe system can be used for introducing water to the filter bed, in the aforedescribed manner.

I claim:

1. A method for washing a filter intended for cleansing a contaminated liquid and comprising a granular bed, a drainage system located beneath the bed, means for introducing first and second liquid flows into the bed, said first liquid flow being operative to fluidize solely upper layers of the bed at least locally, and said second liquid flow being operative to fluidize the bed throughout the whole of the depth thereof, said method further comprising ejecting said flows downwardly into the bed through orifices which are placed in the bed at a location between the highest point and the lowest point therein and which are substantially equidistant from the upper surface of the bed; and introducing said first liquid flow selectively into the upper layers of said bed in a smaller quantity and at a corresponding smaller flow rate than the second liquid flow, such that during the first liquid flow the bed layers beneath said upper layers will be unaffected by washing of said upper layers.

2. A liquid filter comprising a granular bed, a drainage system located at the bottom of the filter bed, and means for introducing a stream of washing liquid such as to fluidize upper layers of the bed, at least locally and at least once between two bed washing processes comprising fluidizing the bed throughout the whole of the depth thereof, said liquid filter further comprising outflow openings for the introduction of liquid downwardly in the bed, said openings being mounted in the upper part of the bed at a vertical distance between the highest point of the bed and the lowest point of said bed at substantially equal distances from the upper surface of the bed; said outflow openings having a cross-sectional area such as to generate the liquid flow rate necessary for the liquid to penetrate to the desired depth of the bed and the liquid filter further comprises means for providing that, when washing solely upper bed layers, a smaller quantity of liquid having a correspondingly smaller flow rate is introduced to the upper bed layers in a washing process, while the remainder of the bed located beneath the regions of the outflow openings remain unaffected by the washing process.

3. A filter according to claim 2, wherein the outflow openings are provided with a circular flow direction device, which is mounted substantially concentrically with and downwardly of the outflow opening.

4. A filter according to claim 2, wherein said outflow openings are carried on a carriage for movement over the filter bed; and wherein means are provided for lowering the outflow openings to a selected level within the bed so as to enable introduction of jets of washing liquid to the selected level.

* * * * *